US008714781B2

(12) United States Patent
Nichol

(10) Patent No.: US 8,714,781 B2
(45) Date of Patent: *May 6, 2014

(54) LIGHT COUPLING INTO ILLUMINATED FILMS

(75) Inventor: Anthony J. Nichol, Boston, MA (US)

(73) Assignee: FLEx Lighting II, LLC, Chicago, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/682,387

(22) PCT Filed: Oct. 7, 2008

(86) PCT No.: PCT/US2008/079041
§ 371 (c)(1),
(2), (4) Date: Apr. 9, 2010

(87) PCT Pub. No.: WO2009/048863
PCT Pub. Date: Apr. 16, 2009

(65) Prior Publication Data
US 2010/0214786 A1 Aug. 26, 2010

Related U.S. Application Data

(60) Provisional application No. 60/978,755, filed on Oct. 9, 2007.

(51) Int. Cl.
*F21V 8/00* (2006.01)
(52) U.S. Cl.
USPC ...... 362/296.01; 362/600; 362/612; 362/623; 362/92; 362/812

(58) Field of Classification Search
USPC .............. 362/296.01, 311.03, 257, 317, 362, 362/311.01, 311.02, 623, 600, 612, 92, 812, 362/551, 559, 247; 40/546, 547, 615; 385/50, 120, 121, 130, 131, 132
See application file for complete search history.

(56) References Cited

U.S. PATENT DOCUMENTS

| 662,514 A | 11/1900 | Wünsche |
|---|---|---|
| 2,732,688 A | 1/1956 | Dickson |

(Continued)

FOREIGN PATENT DOCUMENTS

| CN | 1206661 | 2/1999 |
|---|---|---|
| CN | 1981221 | 6/2007 |

(Continued)

OTHER PUBLICATIONS

Rizzo, G. et al., "The recovery after bending of polycarbonate sheets," Rheol. Acta 20, 133-138 (1981).

(Continued)

*Primary Examiner* — Sharon Payne
(74) *Attorney, Agent, or Firm* — Quarles & Brady LLP

(57) ABSTRACT

A flexible translucent sheet is folded to have portions of its bounding edge closely situated in overlapping relationship, and these overlapping portions are illuminated by a light source. The illumination is transmitted through the interior of the sheet to any adjacent unfolded area of the sheet, which may bear emission areas which are treated so that the light emits from the sheet at these areas. Preferred versions of the invention have a series of legs cut into one edge of the sheet, and the legs are then bundled in stacked relationship, with a light source providing light input into the bundle.

37 Claims, 1 Drawing Sheet

(56) References Cited

U.S. PATENT DOCUMENTS

| | | | |
|---|---|---|---|
| 3,535,537 A | 10/1970 | Powell | |
| 3,933,556 A | 1/1976 | Strack | |
| 4,026,693 A | 5/1977 | Sato | |
| 4,151,582 A | 4/1979 | Grunberger | |
| 4,228,267 A | 10/1980 | Higashizume et al. | |
| 4,389,698 A | 6/1983 | Cibie | |
| 4,422,719 A | 12/1983 | Orcutt | |
| 4,467,481 A | 8/1984 | Ginsburg | |
| 4,511,215 A | 4/1985 | Butler | |
| 4,551,985 A | 11/1985 | Kovach | |
| 4,667,481 A | 5/1987 | Watanabe et al. | |
| 4,824,194 A | 4/1989 | Karasawa | |
| 4,869,570 A | 9/1989 | Yokohama | |
| 5,009,483 A | 4/1991 | Rockwell, III | |
| 5,106,181 A | 4/1992 | Rockwell, III | |
| 5,134,857 A | 8/1992 | Burley | |
| 5,165,187 A | 11/1992 | Shahidi-Hamedani et al. | |
| 5,315,673 A | 5/1994 | Stetter et al. | |
| 5,328,376 A | 7/1994 | West | |
| 5,379,539 A | 1/1995 | Hannula | |
| 5,390,436 A | 2/1995 | Ashall | |
| 5,506,929 A | 4/1996 | Tai et al. | |
| 5,544,268 A | 8/1996 | Bischel et al. | |
| 5,596,671 A | 1/1997 | Rockwell, III | |
| 5,661,839 A | 8/1997 | Whitehead | |
| 5,737,472 A | 4/1998 | Bernasson et al. | |
| 5,789,710 A | 8/1998 | Vanderpoel | |
| 5,818,554 A | 10/1998 | Hiyama et al. | |
| 5,888,324 A | 3/1999 | Nakamura | |
| 5,938,991 A | 8/1999 | Pollock | |
| 6,049,641 A | 4/2000 | Deacon | |
| 6,068,381 A | 5/2000 | Ayres | |
| 6,208,788 B1 * | 3/2001 | Nosov | 385/121 |
| RE37,186 E | 5/2001 | Hill | |
| 6,224,269 B1 | 5/2001 | Engstrand et al. | |
| 6,315,433 B1 | 11/2001 | Cavello | |
| 6,490,090 B1 | 12/2002 | Kumazawa | |
| 6,490,401 B2 | 12/2002 | Cornelissen et al. | |
| 6,498,882 B1 | 12/2002 | Buckelew et al. | |
| 6,577,359 B2 | 6/2003 | Ishihara | |
| 6,592,233 B1 | 7/2003 | Parikka | |
| 6,641,880 B1 | 11/2003 | Deyak et al. | |
| 6,700,054 B2 | 3/2004 | Cherney et al. | |
| 6,750,996 B2 | 6/2004 | Jagt et al. | |
| 6,825,895 B2 | 11/2004 | Nakano et al. | |
| 6,847,424 B2 | 1/2005 | Gotoh et al. | |
| 6,964,226 B2 | 11/2005 | Weiss et al. | |
| 7,004,610 B2 | 2/2006 | Yamashita et al. | |
| 7,108,414 B2 | 9/2006 | McCollum et al. | |
| 7,190,425 B2 | 3/2007 | Hong | |
| 7,237,396 B1 | 7/2007 | Nichol | |
| 7,406,245 B2 | 7/2008 | Page et al. | |
| 7,430,355 B2 * | 9/2008 | Heikenfeld et al. | 385/129 |
| 7,452,120 B2 | 11/2008 | Lee et al. | |
| 7,457,509 B2 | 11/2008 | Haenen et al. | |
| 7,490,967 B2 | 2/2009 | Syribeys | |
| 7,534,022 B2 | 5/2009 | Chou | |
| 7,542,635 B2 | 6/2009 | Coleman | |
| 7,565,054 B2 | 7/2009 | Rinko | |
| 7,570,846 B2 | 8/2009 | Meir et al. | |
| 7,582,000 B2 | 9/2009 | Pendlebury et al. | |
| 7,635,202 B2 | 12/2009 | Awabayashi | |
| 7,639,916 B2 | 12/2009 | Fine | |
| 7,729,941 B2 | 6/2010 | Zampini, II et al. | |
| 7,742,120 B2 | 6/2010 | Bayley et al. | |
| 7,750,886 B2 | 7/2010 | Sampsell | |
| 7,751,663 B2 | 7/2010 | Van Ostrand | |
| 7,773,849 B2 * | 8/2010 | Shani | 385/131 |
| 7,780,329 B2 | 8/2010 | McCollum et al. | |
| 8,013,831 B2 | 9/2011 | Sampsell | |
| 8,128,271 B2 | 3/2012 | Nichol | |
| 8,164,703 B2 | 4/2012 | Cheng | |
| 8,167,461 B2 * | 5/2012 | Nichol | 362/296.01 |
| 8,434,909 B2 | 5/2013 | Nichol et al. | |
| 2002/0015563 A1 | 2/2002 | Murakami | |
| 2002/0028600 A1 | 3/2002 | Kondo | |
| 2003/0016930 A1 | 1/2003 | Inditsky | |
| 2003/0174953 A1 | 9/2003 | Carnevale et al. | |
| 2003/0198456 A1 | 10/2003 | Steiner | |
| 2004/0093779 A1 | 5/2004 | Blach | |
| 2004/0228104 A1 | 11/2004 | Birman | |
| 2005/0072032 A1 | 4/2005 | McCollum et al. | |
| 2005/0091886 A1 | 5/2005 | Kim | |
| 2005/0219148 A1 | 10/2005 | Bayley et al. | |
| 2006/0007108 A1 | 1/2006 | Utsumi et al. | |
| 2006/0008205 A1 | 1/2006 | Meir et al. | |
| 2006/0024017 A1 | 2/2006 | Page et al. | |
| 2006/0061008 A1 | 3/2006 | Karner et al. | |
| 2006/0105149 A1 | 5/2006 | Donahue | |
| 2006/0120106 A1 | 6/2006 | Kuki et al. | |
| 2006/0207134 A1 | 9/2006 | Harry | |
| 2006/0215958 A1 | 9/2006 | Yeo et al. | |
| 2006/0269213 A1 | 11/2006 | Hwang et al. | |
| 2007/0002578 A1 | 1/2007 | Furusawa et al. | |
| 2007/0014110 A1 | 1/2007 | Itaya | |
| 2007/0031097 A1 | 2/2007 | Heikenfeld et al. | |
| 2007/0081360 A1 | 4/2007 | Bailey et al. | |
| 2007/0086712 A1 | 4/2007 | Shani | |
| 2007/0133935 A1 | 6/2007 | Fine | |
| 2007/0153545 A1 | 7/2007 | Lee | |
| 2007/0171330 A1 | 7/2007 | Hung | |
| 2007/0274091 A1 | 11/2007 | Inditsky | |
| 2007/0280593 A1 | 12/2007 | Brychell et al. | |
| 2007/0286562 A1 | 12/2007 | Inditsky | |
| 2008/0007965 A1 | 1/2008 | Kanade et al. | |
| 2008/0025039 A1 | 1/2008 | Guillermo | |
| 2008/0031579 A1 | 2/2008 | Enami et al. | |
| 2008/0037284 A1 | 2/2008 | Rudisill | |
| 2008/0043490 A1 | 2/2008 | Coleman et al. | |
| 2008/0048366 A1 | 2/2008 | Durney | |
| 2008/0148753 A1 * | 6/2008 | Welker et al. | 62/255 |
| 2008/0159693 A1 | 7/2008 | Chang | |
| 2008/0266863 A1 | 10/2008 | Rinko | |
| 2009/0059618 A1 | 3/2009 | Onikiri et al. | |
| 2009/0172978 A1 | 7/2009 | Steenblik et al. | |
| 2009/0173654 A1 | 7/2009 | Steenblik et al. | |
| 2009/0207632 A1 | 8/2009 | McCollum et al. | |
| 2009/0257215 A1 | 10/2009 | Gomi | |
| 2010/0014311 A1 | 1/2010 | Danieli | |
| 2010/0040986 A1 | 2/2010 | Yamaguchi | |
| 2010/0067254 A1 | 3/2010 | Ohta et al. | |
| 2010/0156953 A1 | 6/2010 | Nevitt | |
| 2010/0258419 A1 | 10/2010 | Chung et al. | |
| 2011/0032724 A1 | 2/2011 | Kinoshita | |
| 2011/0176325 A1 | 7/2011 | Sherman et al. | |
| 2011/0227487 A1 | 9/2011 | Nichol et al. | |
| 2011/0255303 A1 | 10/2011 | Nichol et al. | |
| 2011/0273901 A1 | 11/2011 | Nichol et al. | |
| 2011/0273906 A1 | 11/2011 | Nichol et al. | |
| 2011/0277361 A1 | 11/2011 | Nichol et al. | |
| 2011/0283576 A1 | 11/2011 | Nichol | |
| 2011/0286234 A1 | 11/2011 | Nichol | |
| 2012/0287674 A1 | 11/2012 | Nichol et al. | |
| 2013/0155723 A1 | 6/2013 | Coleman | |
| 2013/0250618 A1 | 9/2013 | Nichol et al. | |
| 2013/0314942 A1 | 11/2013 | Nichol et al. | |

FOREIGN PATENT DOCUMENTS

| | | |
|---|---|---|
| CN | 1985202 | 6/2007 |
| CN | 200962289 Y | 10/2007 |
| CN | 101140335 A1 | 3/2008 |
| EP | 0 284 098 Al A1 | 9/1988 |
| EP | 1760502 A1 | 3/2007 |
| GB | 662514 | 11/1900 |
| GB | 198085 | 5/1923 |
| GB | 662514 | 12/1951 |
| JP | 2000141997 A | 5/2000 |
| JP | 2000147218 A | 5/2000 |
| JP | 2000-258633 | 9/2000 |
| JP | 2001-243818 | 9/2001 |
| JP | 2001243818 A | 9/2001 |
| JP | 2001266626 A | 9/2001 |
| JP | 2004199967 A | 7/2004 |

(56) References Cited

FOREIGN PATENT DOCUMENTS

| | | | |
|---|---|---|---|
| JP | 2005340160 A | 12/2005 | |
| JP | 2006-024561 | 1/2006 | |
| JP | 2006310112 A | 11/2006 | |
| JP | 2007 053054 A | 3/2007 | |
| JP | 200753054 A | 3/2007 | |
| WO | 2006131924 A2 | 12/2006 | |
| WO | 2007081862 A2 | 7/2007 | |
| WO | 2007143383 A2 | 12/2007 | |
| WO | 2009048863 A1 | 4/2009 | |
| WO | 2010005655 A2 | 1/2010 | |
| WO | 2010085787 A1 | 7/2010 | |
| WO | 2011130715 A2 | 10/2011 | |
| WO | 2011130718 A2 | 10/2011 | |
| WO | 2011130720 A2 | 10/2011 | |
| WO | 2012016047 A1 | 2/2012 | |
| WO | 2012068543 A1 | 5/2012 | |
| WO | 2012088315 A1 | 6/2012 | |
| WO | 2012122511 A1 | 9/2012 | |
| WO | 2012158460 A1 | 11/2012 | |

OTHER PUBLICATIONS

Chien, Chao-Heng, et al., "The study of LED uniform lightguide for liquid crystal display backlight applications," MEMS LAB, Dept. of Mechanical Engineering, Tatung University, Taipei, R.O.C.

Murata, Toshitaka, et al., "Input couplers for thin light-guides and light-emitting diodes," Optical Engineering 47(2), 027001-1 through 027001-7 (Feb. 2008).

Lee, J. H., "LED Light Coupler Design for a Ultra Thin Light Guide," Journal of Optical Society of Korea, vol. 11, No. 3, Sep. 2007, pp. 113-117.

Siitonen, Samuli et al., "Coupling of light from an LED into a thin light guide by diffractive gratings," Applied Optics, vol. 43, No. 30, pp. 5631-5636, Oct. 20, 2004.

Kim, Joon-Sung, et al. "Stacked Polymeric Multimode Waveguide Arrays for Two-Dimensional Optical Interconnects", Journal of Lightwave Technology, p. 840, Mar. 2004.

Luminus Devices PhlatLight Data Sheet, PDS-001022 Rev 05, 2009.

International Preliminary Examination Report (IPER), PCT/US08/79041, Jan. 8, 2009.

Cardinal Intellectual Property's search report (Work Order 5874.5) including the results of a search for the features of the claims included in the U.S. patent application entitled "Light Coupling Into Films," inventor: Anthony Nichol. The foregoing U.S. patent application is a continuation of U.S. Appl. No. 12/682,387.

Cardinal Intellectual Property's search report (Work Order 5874.6) including the results of a search for the features of the claims included in the U.S. patent application entitled "Method of Manufacturing a Light Emitting Device," inventor: Anthony Nichol. The foregoing U.S. patent application is a continuation of U.S. Appl. No. 12/682,387.

Cardinal Intellectual Property's supplemental search report dated Nov. 7, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.

International Search Report for International Application No. PCT/US2012/028578 dated Jun. 28, 2012.

Written Opinion of the International Searching Authority for International Application No. PCT/US2012/028578 dated Jun. 28, 2012.

European Search Report and Written Opinion for European Application No. EP08838526 dated Sep. 19, 2012 including English language translation and computer translation of JP 2005-340160.

Office Action dated Sep. 10, 2012 by the State Intellectual Property Office of China for Application No. CN201080005385.0.

International Search Report for International Application No. PCT/US2012/37317 dated Aug. 22, 2012.

Writtten Opinion of the International Searching Authority for International Application No. PCT/US2012/37317 dated Aug. 22, 2012.

Written Opinion of the International Searching Authority for International Application No. PCT/US11/066596 dated May 7, 2012.

International Search Report for International Application No. PCT/US11/066596 dated May 7, 2012.

Written Opinion of the International Searching Authority for International Application No. PCT/US11/61528 dated Mar. 26, 2012.

International Search Report for International Application No. PCT/US11/61528 dated Mar. 26, 2012.

Written Opinion of the International Searching Authority for International Application No. PCT/US11/045730 dated Dec. 23, 2011.

International Search Report for International Application No. PCT/US11/045730 dated Dec. 23, 2011.

Written Opinion of the International Searching Authority for International Application No. PCT/US10/22066 dated Mar. 22, 2010.

International Search Report for International Application No. PCT/US10/22066 dated Mar. 22, 2010.

Written Opinion of the International Searching Authority for International Application No. PCT/US08/079041 dated Jan. 8, 2009.

Written Opinion of the International Searching Authority for International Application No. PCT/US11/032792 dated Nov. 17, 2011.

International Search Report for International Application No. PCT/US11/032797 dated Nov. 7, 2011.

Written Opinion of the International Searching Authority for International Application No. PCT/US11/032797 dated Nov. 7, 2011.

International Search Report for International Application No. PCT/US11/032795 dated Nov. 16, 2011.

Written Opinion of the International Searching Authority for International Application No. PCT/US11/032795 dated Nov. 16, 2011.

International Search Report for International Application No. PCT/US11/032792 dated Nov. 17, 2011.

Office action dated Dec. 6, 2012 by the USPTO for U.S. Appl. No. 13/088,231.

Notice of allowance dated Jan. 7, 2013 by the USPTO for U.S. Appl. No. 13/089,311.

Office action dated Mar. 5, 2013 by the Japan Patent Office for application No. 2010-528972.

Office action dated May 15, 2012 by the USPTO for U.S. Appl. No. 12/682,387.

Office action dated Dec. 23, 2011 by the USPTO for U.S. Appl. No. 12/682,387.

Office action dated Jul. 23, 2012 by IP Australia for application No. 2010206525.

Office action dated Nov. 22, 2012 by Instituto Mexicano de la Propiedad Industrial for application MX/a/2011/007770.

Buchner, Diplomarbeit: Kinetmatics of 3D Folded Structures for Nanostructured Origami, Department of Mechanical Engineering, 3D optical Systems Group, Massachusetts Institute of Technology, 2003.

Nichol, A.J.; Barbastathis, G., "Sub-30nm alignment accuracy between layered photonic nanostructures using optimized V nanomagnet arrays," Optical MEMs and Nanophotonics, 2008 IEEE/LEOS Internationall Conference on, vol. No. pp. 9,10, Aug. 11-14, 2008.

Arora et al., "Membrane folding to achieve three-dimensional nanostructures: Nanopatterned silicon nitride folded with stressed chromium hinges," Appl. Phys. Lett. 88, 053108 (2006).

"Nanostructured Origami Folding of Patternable Resist for 3D Lithography," Se Young Yang, Hyung-ryul Johnny Choi, Martin Deterre, George Barbastathis, IEEE 2010 International Conference on Optical MEMS & Nanophotonics, p. 37-38, Aug. 2010.

U.S. Appl. No. 12/682,387, Information Disclosure Statement dated Jan. 22, 2014. List of patent applications, which share at least some common disclosure with the instant application, serve as a basis of priority for the instant application, and/or otherwise relate to the instant application.

Office action dated Dec. 3, 2013 by Japan Patent Office for application No. 2010-528972.

\* cited by examiner

LIGHT COUPLING INTO ILLUMINATED FILMS

CROSS-REFERENCE TO RELATED APPLICATIONS

This application claims priority under 35 USC §119(e) to U.S. Provisional Patent Application 60/978,755 filed Oct. 9, 2007, the entirety of which is incorporated by reference herein.

FIELD OF THE INVENTION

This document concerns an invention relating generally to lightguides such as fiberoptic cable and edge-lit films, and more specifically to devices and methods for providing edge-lighting for films with high efficiency.

BACKGROUND OF THE INVENTION

There are numerous forms of lightguides, with perhaps the most common being the optical fiber, which is typically formed as a clear glass or plastic cylinder with a diameter of 1 micrometer to 5 mm. A light source is coupled to an end of the optical fiber, and is transmitted through its length, typically with the intent of delivering as much of the light as possible to the opposite end of the optical fiber. Some of the light is lost along the length of the optical fiber owing to light absorption and light scattering (i.e., light escaping through the surface of the fiber). However, with the choice of appropriate materials and manufacturing processes, absorption and scattering losses can be minimized. For example, whereas an optical fiber formed of plastic (e.g., polymethyl methacrylate or PMMA) typically has an attenuation of less than 0.2 dB per meter, an optical fiber formed of high-grade fused silica typically has an attenuation of less than 0.01 dB per meter. Plastic lightguides tend to have greater losses, and thus tend to be used only in circumstances where light only needs to be transmitted short distances. Scattering can also be reduced by forming an optical fiber with a core having a higher refractive index, and an outer layer having a lower refractive index, so that light received by the core experiences internal reflection (i.e., it reflects from the boundary between the core and the outer layer and continues to travel along the fiber, rather than being transmitted from the core to the outer layer and its surroundings). Efficient light transfer is also enhanced if the light source is coupled to the end of the optical fiber with high efficiency so that the greatest possible amount of light from the light source is transmitted into the fiber. Good coupling efficiency can be achieved by (for example) treating the end of the optical fiber to be as smooth and transparent as possible, thereby better allowing the light to be transferred into the end of the fiber rather than being reflected therefrom, and by transmitting the light from the light source to the fiber using an optical coupling gel matched to the refractive index of the fiber.

Another form of lightguide is a transparent plate which has a light source coupled to one edge. This arrangement is often referred to as "edge-lighting," and it typically requires plates with thicknesses greater than 2 mm to achieve effective coupling from typical light sources such as light emitting diodes (LEDs) and halogen, incandescent, metal halide or xenon lamps. The surface of a plate may be treated at certain areas, as by surface roughening, etching, or the addition of a material that promotes light scattering (e.g., white paint), to reduce or defeat internal reflection at these areas to cause light emission from the plate at these or adjacent areas. As a result, the treated areas appear to glow. Because the plates typically do not efficiently receive or transmit light, and have higher losses along their lengths, the treated areas must often be functionally graded (i.e., they must generate lesser scattering near the light source and greater scattering farther from the light source) if the treated areas are to appear to have uniform illumination.

The plates are typically rigid, having very limited flexibility, though in some cases flexible plastic films are used (typically having a thickness of 0.5 mm or so). However, these are rarely used because it is difficult to efficiently couple light into such films at low cost. Most light sources have dimensions greater than millimeters, with the films having much smaller thicknesses for receiving the input light, so it is difficult to efficiently and inexpensively channel the majority of the light source's light output into the edge of the film. One solution to this problem is presented in U.S. Pat. No. 7,237,396, wherein a light source is coupled to the first ends of a bunched bundle of optical fibers, and the second ends are spread along an edge of the film to effectively provide an array of input light sources. The drawback of this approach is that it can be time-consuming and difficult to achieve: for efficient coupling, the second ends of the fibers must be precisely aligned with the edge of the film; treatment of the fiber ends and film edge to reduce scatting is time-consuming; and similarly the assembly demands of the system (which preferably uses optical coupling gel at the various optical interfaces) are high. There are also losses at the interface between the light source and the bundle, since the spaces between the fibers in the bundle create a loss. It would therefore be advantageous to have devices and methods available for high-efficiency coupling of light sources to films and plates with lower cost and ease of manufacture and assembly.

SUMMARY OF THE INVENTION

The invention, which is defined by the claims set forth at the end of this document, is directed to devices and methods which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring to FIGS. 1A-1C for a schematic view of an exemplary version of the invention, a flexible sheet 100 of at least partially translucent material is surrounded by a bounding edge 102 (see particularly FIG. 1A). The sheet 100 is folded upon itself—here twice, once in FIG. 1B and once in FIG. 1C—such that portions 102A, 102B, 102C, 102D, 102E, 102F of the bounding edge 102 overlap, and an unfolded portion 104 (a "body") is left where the sheet 100 is not folded upon itself. In this example, the sheet 100 is formed with a number of discrete legs 106 extending from the unfolded portion/body 104, and the legs 106 each terminate at the portions 102A, 102B, 102C, 102D, 102E, 102F of the bounding edge 102 which are to overlap. The legs 106 are folded between their bounding edges 102A, 102B, 102C, 102D, 102E, 102F and the body 104 at folds 108 (as seen in FIG. 1B, as well as in FIG. 1C) such that at least some of the legs 106 are bent into stacked relationship, with their bounding edges 102A, 102B, 102C, 102D, 102E, 102F preferably being at least substantially aligned, and also being prepared to define an at least substantially smooth and continuous surface (e.g.

by polishing). One or more light sources 110 can then be situated to illuminate the adjacently situated bounding edges 102A, 102B, 102C, 102D, 102E, 102F of the stacked legs 106. The light is received by the overlapping edges 102A, 102B, 102C, 102D, 102E, 102F, which inherently provide an area greater than the thickness of the sheet 100 so that the sheet 100 (the stacked edges 102A, 102B, 102C, 102D, 102E, 102F) more efficiently receive a greater amount of light from the light source 110. The received light is transmitted through the sheet 100 via internal reflection such that the unfolded portion/body 104 is internally illuminated. To enhance such internal reflection, the sheet 100 preferably bears a layer of reflective material, and/or of a material with a lower refractive index, on its non-illuminated bounding edges 102 and on one or more of its faces 112. Areas 114 on the face(s) 112 of the sheet 100 can then be made to emit light by disrupting internal reflection at these areas 114, as by roughening their surfaces, removing any reflective layers, adding colorants or other less-reflective material, or otherwise preparing these areas 114 such that the light within the sheet 100 tends to emit at these areas 114 to a greater extent than at surrounding areas. Alternatively or additionally, areas 114 of the sheet 100 can be treated to fluoresce in response to some or all of the wavelengths of light provided to the sheet 100, such that these areas 114 will appear to be illuminated.

Further advantages, features, and objects of the invention will be apparent from the remainder of this document in conjunction with the associated drawings.

DETAILED DESCRIPTION OF PREFERRED VERSIONS OF THE INVENTION

Figure 1A:
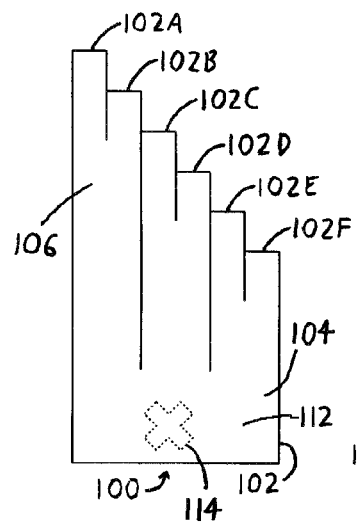
FIGS. 1A-1C present schematic views of a flexible translucent sheet 100 having legs 106 (in FIG. 1A) which are folded into stacked/overlapping sets (in FIG. 1B, and also in FIG. 1C) to define input areas 116 at which light may be input from one or more light sources 110 to cause emitting areas 114 to emit light.

Expanding on the discussion given in the foregoing Summary, the sheets used in the invention may have any appropriate form. The sheets preferably have at least substantially uniform thickness (with thickness often being between 0.025 mm to 0.5 mm thick), and preferably bear the aforementioned layers of reflective and/or lower refractive index material on one or more of their surfaces (most preferably on at least their opposing major faces). If legs are formed in a sheet, the legs are preferably cut using a method which leaves cut edges which are as optically smooth as possible to promote efficient internal reflection at these edges. Stamping or cutting with very sharp and/or heated blades, or using laser cutting or another form of thermal cutting, can promote smoothness. Other forms of cutting, e.g., water jet cutting, can also provide acceptable results. Polishing can occur after cutting to further promote smoothness, and such polishing can be performed mechanically (e.g., with abrasives), thermally (e.g., by surface melting), and/or chemically (e.g., by application of caustics).

The invention can be generated without forming legs in the sheet, as by pleating/folding one end of a sheet to form a stacked light input area, and leaving the other end of the sheet unfolded to define the body to be illuminated. However, such an arrangement can be bulky in comparison to the arrangements shown in the drawings. One can choose among arrangements with or without legs, or may combine features of these arrangements, to achieve an arrangement which best fits the space requirements for the application at hand. Any pleated areas, stacked legs, or similar arrangements can be mechanically urged together, melted together, and/or adhered together (preferably with an adhesive having the same index of refraction as the sheet, or a lower one so as to serve as a reflective layer) for ease of handling, and potentially for better coupling efficiency at the light input area.

Figure 1B:
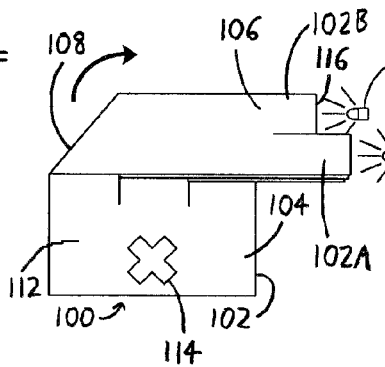
Figure 1C:
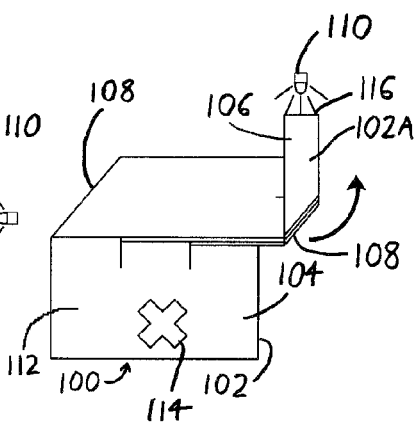
Figure 2:
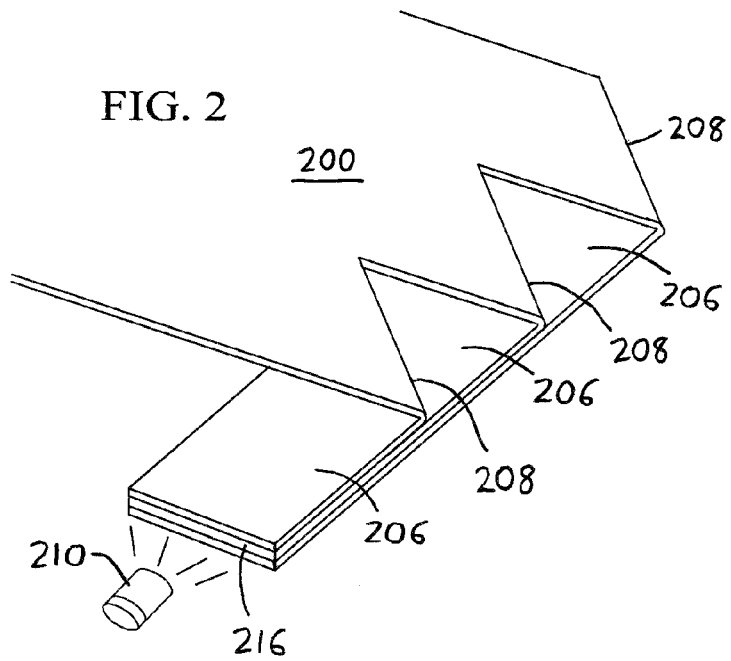
FIG. 2 is a schematic view of a flexible translucent sheet 200 showing an arrangement similar to that of FIGS. 1B-1C, wherein the legs 206 of sheet 200 are folded at bends 208 to define an input area 216 for a light source 210.

It is notable that where sheets are folded/bent, the folds/bends are preferably such that they do not generate an immediate 180 degree change in direction of a sheet, but rather they have some radius of curvature. This helps to promote more efficient internal reflection, and additionally some films can "craze" (i.e., whiten or otherwise introduce a scattering haze) if overly stressed by a sharp bend. Preferably, the radius of curvature of a bend/fold will be at least ten times the thickness of the film., with greater radii of curvature helping to reduce the possibility of light loss. Radii of curvature of 75 times the thickness of the film or less are useful for providing acceptable light losses versus the space required for accommodating the gradual folds/bends. However, if space or other considerations make sharp bends/folds preferable, light loss can be reduced by applying reflective and/or low refractive index cladding layers at the folds/bends, and/or by treating sheets to reduce stress when they are being folded/bent (as by heating sheets to become more plastic). Any folds/bends that are made in the sheets need not redirect legs into directions perpendicular to their axes, as shown in the examples of FIGS. 1 and 2, and folds can instead (or additionally) be made at different angles (e.g., to redirect legs along angles oriented 45 degrees to their original unfolded states).

The use of flexible sheets as lightguides provides many advantages over the use of rigid sheets. The invention's improvement in light-coupling efficiency and cost is particularly pronounced at sheet thicknesses below 0.25 mm, which is approximately the size of average LED and laser diode chips suitable for use in edge lighting applications. Thus, below 0.25 mm sheet thicknesses, it becomes particularly difficult and/or expensive to generate arrangements for efficiently coupling light into the sheet edge from a chip because of etendue and manufacturing tolerance limitations. Further, since the sheets of the invention are flexible, the sheets can shape to surfaces (e.g., a window surface) without appreciably changing in a surface's shape, thickness and/or appearance, and they can deform as needed (including during use, e.g., an illuminated sheet may wave in the air, and/or during storage, e.g., a sheet can be rolled or folded when not in use). Such flexible sheets are also typically less expensive, thinner and lighter, and easier to store and machine than rigid sheets, assisting in reduction of material, fabrication, storage and shipping costs. Rolls of appropriate sheet material are readily available with widths up to 20 feet (6 meters), and with lengths of thousands of feet/meters, allowing the production of very large sheets where desired (e.g., for billboards or other large signage). Since flexible films are used in many industries, many providers of sheet treatment services (e.g., cutting and coating/laminating services) are available. Additionally, many film manufacturers can accommodate coextrusion of films bearing from two to hundreds of layers, and/or coating of films, so it is relatively easy and inexpensive to generate sheets having different layers which decrease light loss and/or otherwise promote internal reflection.

The light source may be any suitable light source noted in this document, and may take any other suitable form as well. Such light sources may be directly coupled to the light input area (i.e., the overlapping edges of the sheet), or may be coupled via an intermediate lightguide, such as an optical fiber (or bundle) which provides the light from the light source to the light input area. The light sources need not emit visible light, and they might interact with the light-emitting areas of the sheet to emit visible light at these areas. More than one light input area can be provided on a sheet (and multiple light sources can be used); for example, two or more sets of the legs shown in FIGS. 1-2 might be provided on opposing or different bounding edges of a sheet, and each might be supplied with light from a different light source (or from the same light source, if the stacked legs from each edge are bent/folded to route to the same light source). In similar respects, multiple sheets can be provided with light from the same light source, as by having the same light source illuminate the stacked legs of more than one sheet. If desired, the legs from the separate sheets can be stacked together, perhaps in interleaved fashion. Legs need not be folded and stacked in an orderly manner, and multiple legs could simply extend outwardly, and then be gathered in a disorganized bundle to have their bounding edges stacked in random order. Stacking need not have all edges situated in a linear array, and legs could, for example, be stacked side-by-side in addition to being stacked top-to-bottom, such that the input area presents a two-dimensional array of leg ends.

To illustrate an exemplary construction of the invention in greater detail, a 0.01 inch (0.25 mm) thick and 48 inch (122 cm) wide roll of BPA (bisphenol A) polycarbonate film was used to construct illuminated sheets. The sheet had a yellowness index of less than 0.54 measured using the ASTM D1925 standard. (The yellowness index is related to the light absorption within the sheet, and is preferably minimized to reduce absorption losses and/or color shifting.) Similarly, the haze of the sheet was less than 0.5% as measured using the ASTM D1003 standard. (Haze is a value related to light scattering caused from imperfections on the sheet surface and the existence of particles, air bubbles, or other imperfections within the sheet's volume, and haze, like the yellowness index, is also preferably minimized in the invention where greater light transmission is desired.) In testing, this material was found to allow high-quality light transfer, without any significant degradation or color shifting, for approximately 8 feet (2.4 m) within the sheet, without significant color shifting, when a broad band xenon illumination source was input at the edge. At greater than 8 feet, color began to shift from white to red due to uneven absorption of longer and shorter wavelengths, but otherwise light intensity was substantially maintained for approximately 20 feet (6 m) along the sheet with minimal light leakage from haze.

The sheet was cut down into a 20 inch by 8 inch (51 cm by 20 cm) sheet using a #11 scalpel blade. Eleven legs having 10 inch (25 cm) length and approximately 0.73 inch (1.8 cm) width were cut using #11 scalpel blades mounted in spaced relation on a bar between two guiderails, such that the bar could be translated to have the blades thereon cut the sheet beneath. After cutting the slots, surface roughening and colorants were added to portions of the roughly 10 inch by 10 inch (25 cm by 25 cm) body to frustrate internal refection at these areas. Different methods for adding the areas were used, such as sandblasting, surface scratching, and inkjet printing of a light-scattering pigment. The legs were then folded and stacked in a manner similar to that illustrated in FIG. 2. After stacking, the ends of the legs were cut using a heated scalpel blade so that they better defined a smooth and continuous light input area. The bounding edges of the legs partially melted together during such cutting, enhancing smoothness and continuity.

A green solid-state light source, more specifically a PhlatLight PT120 offered from Luminus Devices, Inc. (Billerica, Mass., USA), was then coupled to the light input area. The light traveled down the legs into the unfolded body area, and scattered at the treated areas, causing them to glow/illuminate. Some light loss/scattering also occurred at the edges of the legs and unfolded body area owing to the surface roughness of the cut edges. This was reduced by polishing the surfaces of the sheet edges using methylene chloride vapor polishing so that more optically smooth edges were generated. Illumination also improved with better coupling of the light source at the input areas, as by placing the light source within a reflective shroud so concentrate the emitted light onto the input area, and with polishing of the input area (with flame polishing being used).

To illustrate another exemplary construction of the invention, a roll of BPA (bisphenol A) polycarbonate film having 0.01 inch (0.25 mm) thickness was coated with a 2-10 micrometer thick cladding layer of material having a lower refractive index using a sheet coater. The chosen cladding material was the TC106 coating from Sun Process Corporation (Mt. Prospect, Ill., USA). The cladded film was then stamped into smaller sheets with predefined legs. A stack of sheets was placed in a methylene chloride vapor etching chamber to simultaneously polish their edges. Areas of the sheets were scraped to remove their cladding so that these areas would later illuminate when light is supplied to the sheets. The legs of each sheet were then folded so that their bounding edges were aligned in stacked relationship to provide a light input area. When a light input area of a sheet was illuminated in the manner discussed above, the treated areas lit up brightly, and when the illumination was removed, the treated areas were barely visible.

The illuminated sheets provided by the invention have numerous applications. Following are several examples.

Initially, there are numerous general illumination and backlighting applications. General home and office lighting could be provided by applying sheets to ceilings or walls, and the flexibility of the sheets can usefully allow them to be applied to non-planar surfaces. Since the sheets can accept high-intensity point sources of light and disperse the light over a wide area, the sheets offer a useful means for adapting LED lights—which are often too intense for general home/office illumination, and which require diffusion for comfortable viewing—for use in general illumination.

The sheets are also highly useful for use in illuminated signs, graphics, and other displays. Since a sheet can be installed on a wall or window without significantly changing its appearance, with the light-emitting area(s) becoming visible when the light source(s) are activated, the invention allows displays to be located at areas where typical displays would be aesthetically unacceptable (e.g., on windows). The sheets may also be used in situations where space considerations are paramount, e.g., when lighting is desired within the ice of skating rinks (as discussed in U.S. Pat. No. 7,237,396, which also describes other features and applications that could be utilized with the invention). The flexibility of the sheets allows them to be used in lieu of the curtains sometimes used for climate containment, e.g., in the film curtains that are sometimes used at the fronts of grocery store freezers to better maintain their internal temperatures. The flexibility of the sheets also allows their use in displays that move, e.g., in flags that may move in the breeze.

The sheets can be used for backlighting or frontlighting purposes in passive displays, e.g., as a backlight for an illuminated advertising poster, as well as for active (changing) displays such as LCD displays. Such applications generally require compact, low-cost white-light illumination of consistent brightness and color across the illuminated area. It is cost-effective and energy-efficient to mix the light from red, blue, and green LEDs for this purpose, but color mixing is often problematic. However, with the invention, red, blue, and green light sources can all be input into each stack of legs/input areas, and by the time the light reaches the sheet, it will be sufficiently mixed that it appears as white light. The light sources can be geometrically situated, and adjusted in intensity, to better provide uniform intensities and colors across the body. A similar arrangement can be attained by providing stacked sheets (more specifically stacked sheet bodies) wherein the colors in the sheets combine to provide white light. Since some displays are provided on flexible substrates—for example, "E-ink" thin-film displays on printed pages—the sheets provide a means for allowing backlighting while maintaining the flexibility of the display's media.

It is also notable that the invention has utility when operated "in reverse"—that is, the light-emitting face(s) of a sheet could be used as a light collector, with the sheet collecting light and transmitting it through the legs to a photosensitive element. As an example, sheets in accordance with the invention could collect incoming light and internally reflect it to direct it to a photovoltaic device for solar energy collection purposes. Such an arrangement can also be useful for environmental monitoring/sensing purposes, in that the sheet can detect and collect light across a broad area, and the detector(s) at the legs will then provide a measurement representative of the entire area. A sheet could perform light collection of this nature in addition to light emission. For example, in lighting applications, a sheet might monitor ambient light, and then might be activated to emit light once twilight or darkness is detected. Usefully, since it is known that LEDs can also be "run in reverse"—that is, they can provide output current/voltage when exposed to light—if LEDs are used as an illumination source when a sheet is used for light emission, they can also be used as detectors when a sheet is used for light collection.

The invention is not limited to the preferred versions of the invention described above, but rather is intended to be limited only by the claims set out below. Thus, the invention encompasses all different versions that fall literally or equivalently within the scope of these claims.

What is claimed is:

1. A film illumination system including:
    a. a transparent polymer sheet having opposing planar faces with a thickness not greater than 0.5 mm therebetween, the sheet defining a body with an array of elongated legs extending therefrom, wherein:
        (1) each leg has a bounding edge with opposing lengthwise edges extending therefrom,
        (2) the lengthwise edges are optically smooth such that at least substantial total internal reflection is provided to light traveling within the legs and encountering the edges, and
        (3) each leg is folded at a radius of curvature less than 50 times the sheet thickness such that the portions of the leg on the opposing sides of the fold have:
            i. faces oriented in at least substantially parallel planes, and
            ii. lengthwise axes extending at a nonzero angle with respect to each other, with the bounding edges being stacked in parallel face-to-face relation; and
    b. a light source:
        (1) emitting non-collimated light from an emission area greater than the thickness of the sheet, and
        (2) optically coupled to the stacked bounding edges of the legs, such that the light from the light source enters the bounding edges to travel to the body.

2. The film illumination system of claim 1 wherein the light source comprises one or more light emitting diodes.

3. The film illumination system of claim 2 wherein:
    a. the light source comprises light emitting diodes, each having a different color of emitted light; and
    b. the length of the legs is such that the different colors are mixed upon reaching the body, whereby the body emits a color of light different from that of the light emitting diodes.

4. The film illumination system of claim 2 wherein the light source comprises red, green, and blue light emitting diodes.

5. The film illumination system of claim 1 wherein the legs are folded to a radius of curvature less than 25 times the sheet thickness.

6. The film illumination system of claim 1 wherein the faces of the legs at the bounding edges are at least substantially parallel to the faces of the legs where the legs join the body.

7. The film illumination system of claim 1 wherein the portions of the leg on the opposing sides of the fold have lengthwise axes oriented at an angle of at least substantially 90 degrees with respect to each other.

8. The film illumination system of claim 1 wherein the portions of the leg on the opposing sides of the fold have lengthwise axes oriented at an angle of at least substantially 45 degrees with respect to each other.

9. The film illumination system of claim 1 wherein the legs are formed by cutting them within the sheet.

10. The film illumination system of claim 1 wherein the stacked bounding edges are at least substantially aligned to define an at least substantially smooth and continuous surface.

11. The film illumination system of claim 10 wherein the stacked bounding edges are polished.

12. The film illumination system of claim 10 wherein the stacked bounding edges are at least partially melted together.

13. The film illumination system of claim 1 wherein at least one or more of the faces of the sheet bears a layer of at least one of:
    a. a reflective material, and
    b. a material having a lower refractive index than the sheet.

14. The film illumination system of claim 1 wherein at least one of the faces of the sheet bears an area which is:
    a. roughened, and/or
    b. rendered less translucent or reflective, to reduce internal reflection of light within the sheet at or adjacent the area.

15. The film illumination system of claim 1 wherein:
    a. at least a portion of the sheet fluoresces when exposed to light at an activating wavelength; and
    b. the light source emits light at the activating wavelength.

16. The film illumination system of claim 1 wherein the body of the sheet is situated in abutment with a liquid crystal display.

17. The film illumination system of claim 1 wherein the body of the sheet is situated in abutment with a sign.

18. The film illumination system of claim 1 wherein the sheet has a thickness of less than 0.25 mm.

19. The film illumination system of claim 1 wherein:
   a. the light from the light source visibly exits one or more areas of the body, and
   b. the body, when not receiving light from the bounding edges, is at most barely visible.

20. The film illumination system of claim 1 wherein the body further comprises:
   a. a second array of elongated legs extending therefrom, each leg within the second array having a second bounding edge with opposing second lengthwise edges extending therefrom, and
   b. a second light source optically coupled to the second bounding edges of the second array of legs, wherein the light from the second light source enters the second bounding edges of the second array of legs to travel to the body.

21. The illumination system of claim 20 wherein the second array of legs is spaced on the body away from the first array of legs, with the spacing between the first and second arrays having no legs therein.

22. The illumination system of claim 20 wherein the first and second arrays of legs are situated on opposite sides of the body.

23. An illumination system comprising:
   a. an at least partially translucent body having opposing faces with a thickness not greater than 0.5 mm therebetween, the body having a first array of elongated legs extending therefrom, wherein:
      (1) each leg terminates in a bounding edge with opposing lengthwise edges extending therefrom,
      (2) the lengthwise edges are optically smooth such that at least substantial total internal reflection is provided to light traveling within the legs and encountering the lengthwise edges, and
      (3) each leg is folded at a radius of curvature less than 50 times the thickness of the body, such that the portions of the leg on the opposing sides of the fold have:
         i. faces oriented in at least substantially parallel planes, and
         ii. lengthwise axes extending at a nonzero angle with respect to each other, with the bounding edges being situated in a stack, and
   b. a light source:
      (1) emitting light from an emission area greater than the thickness of the body, and
      (2) being optically coupled to the stacked bounding edges of the legs, such that the light from the light source enters the bounding edges and travels therefrom within the legs to the body, with the light from the legs mixing within the body.

24. The illumination system of claim 23 wherein the body further comprises:
   a. a second array of elongated legs extending therefrom, each leg within the second array terminating in a second bounding edge, and
   b. a second light source optically coupled to the second bounding edges of the second array of legs, wherein the light from the second light source enters the second bounding edges of the second array of legs to travel to the body, with the light from the second array of legs mixing with the light from the first array of legs within the body.

25. The illumination system of claim 24 wherein the second array of legs is spaced on the body away from the first array of legs, with the spacing between the first and second arrays having no legs therein.

26. The illumination system of claim 24 wherein the first and second arrays of legs are situated on opposite sides of the body.

27. The film illumination system of claim 24 wherein:
   a. the light from the light source visibly exits one or more areas of the body, and b. the body, when not receiving light from the bounding edges, is at most barely visible.

28. An illumination system comprising:
   a. a body having opposing faces with a thickness of less than about 0.5 mm therebetween, the body:
      (1) being at least substantially translucent, wherein an object can be viewed through the opposing faces of the body without any significant changes in appearance, and
      (2) having an array of elongated legs extending therefrom, wherein:
         i. each leg has opposing lengthwise edges extending to a bounding edge,
         ii. each leg is folded at a radius of curvature less than 50 times the thickness of the body, with:
            A. the portions of the leg on the opposing sides of the fold having lengthwise axes extending at a nonzero angle with respect to each other, and
            B. the bounding edges being stacked; and
   b. a light source:
      (1) emitting light from an emission area greater than the thickness of the body, and
      (2) being optically coupled to the stacked bounding edges of the legs, such that the light from the light source enters the bounding edges to travel within the legs and mix within the body.

29. The illumination system of claim 28 further comprising:
   a. a display situated in abutment with one of the opposing faces of the body, with the display extending across at least a major portion of the area of the abutting face of the body;
   b. wherein light from the light source is emitted from the body in the direction toward the display.

30. The illumination system of claim 28 wherein one of the opposing faces of the body is situated in abutment with a window.

31. The illumination system of claim 28 wherein one of the opposing faces of the body is situated in abutment with a display which bears moving images.

32. The film illumination system of claim 28 wherein:
   a. the light from the light source visibly exits one or more areas of the body, and
   b. the body, when not receiving light from the bounding edges, is at most barely visible.

33. An illumination system including an at least partially translucent body comprising:
   a. opposing faces with a thickness not greater than 0.5 mm therebetween, and
   b. first and second arrays of elongated legs extending from the body, wherein:
      (1) each leg has a bounding edge with opposing lengthwise edges extending therefrom toward the body, the lengthwise edges being sufficiently smooth to support multiple total internal reflections extending therefrom,
      (2) each leg is foldable:
         i. at a radius of curvature less than 50 times the thickness of the body,
         ii. with the portions of the leg on the opposing sides of the fold having lengthwise axes extending at a nonzero angle with respect to each other, and iii. with the bounding edges being aligned in a stacked relationship, without crazing or stress whitening, and c. one or more total internal reflection disruption areas disposed on the body, wherein light transmitted into the body from the legs is:
   (1) emitted from the body at the total internal reflection disruption areas, and
   (2) elsewhere at least substantially totally internally reflected between the faces.

34. The illumination system of claim 33 wherein the second array of legs is spaced on the body away from the first array of legs, with the spacing between the first and second arrays having no legs therein.

35. The illumination system of claim 33 wherein the first and second arrays of legs are situated on opposite sides of the body.

36. The illumination system of claim 33 further comprising a display situated in abutment with one of the opposing faces of the body, with the display extending across at least a major portion of the area of the abutting face of the body.

37. The film illumination system of claim 33 wherein the body, when not receiving light from the legs, is at most barely visible.

* * * * *